United States Patent
Barrick et al.

(10) Patent No.: US 7,363,468 B2
(45) Date of Patent: Apr. 22, 2008

(54) LOAD ADDRESS DEPENDENCY MECHANISM SYSTEM AND METHOD IN A HIGH FREQUENCY, LOW POWER PROCESSOR SYSTEM

(75) Inventors: Brian David Barrick, Pflugerville, TX (US); Kimberly Marie Fensler, Round Rock, TX (US); Dwain Alan Hicks, Pflugerville, TX (US); David Scott Ray, Georgetown, TX (US); David Shippy, Austin, TX (US); Takeki Osanai, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 10/992,381

(22) Filed: Nov. 18, 2004

(65) Prior Publication Data
US 2006/0106987 A1 May 18, 2006

(51) Int. Cl.
*G06F 9/30* (2006.01)
(52) U.S. Cl. .................. 712/216; 712/217; 712/219; 711/125; 711/140

(58) Field of Classification Search .................. None
See application file for complete search history.

(56) References Cited

U.S. PATENT DOCUMENTS

| | | | | |
|---|---|---|---|---|
| 6,021,485 A | * | 2/2000 | Feiste et al. | 712/216 |
| 6,079,002 A | * | 6/2000 | Thatcher et al. | 711/169 |
| 6,226,713 B1 | * | 5/2001 | Mehrotra | 711/118 |
| 6,247,124 B1 | * | 6/2001 | Joshi et al. | 712/240 |
| 6,732,236 B2 | * | 5/2004 | Favor | 711/118 |
| 2002/0091914 A1 | * | 7/2002 | Merchant et al. | 712/219 |

OTHER PUBLICATIONS

A Large, fast instruction window for tolerating cache misses by Lebeck, A. R. et al. published 2002, ISBN: 0-7695-1605-x, (ICSA '02), pp. 59-70.*

* cited by examiner

*Primary Examiner*—Hyung S. Sough
*Assistant Examiner*—Kaushik Patel
(74) *Attorney, Agent, or Firm*—Carr LLP; D'Ann N. Rifai

(57) ABSTRACT

The present invention provides for a method for a load address dependency mechanism in a high frequency, low power processor. A load instruction corresponding to a memory address is received. At least one unexecuted preceding instruction corresponding to the memory address is identified. The load instruction is stored in a miss queue. And the load instruction is tagged as a local miss.

5 Claims, 2 Drawing Sheets

LOAD ADDRESS DEPENDENCY MECHANISM SYSTEM AND METHOD IN A HIGH FREQUENCY, LOW POWER PROCESSOR SYSTEM

TECHNICAL FIELD

The present invention relates generally to the field of computer processor instruction sequencing and, more particularly, to a load address dependency mechanism system and method in a high frequency, low power processor system.

BACKGROUND OF THE INVENTION

A common problem found in high performance microprocessor designs is detecting and handling load address dependencies, and in particular, load and store memory address conflicts. Generally, a load and store memory address conflict occurs when a load instruction follows a store instruction directed to the same memory address, and the store instruction has not yet been committed to memory or otherwise cleared. A load and store memory address conflict is typically referred to as a "load-hit-store" condition. Another load address dependency is a load and reload memory address conflict. Generally, a load and reload memory address conflict occurs when a load instruction follows an earlier load, or reload, instruction directed to the same memory address, and the earlier load instruction has not yet been executed or otherwise cleared. A load and reload memory address conflict is typically referred to as a "load-hit-reload" condition. It will be understood to one skilled in the art that, generally, a load-hit-reload condition can be an address collision with an older load-type operation that has not yet executed, and that a load-type operation can include any operation that is operable to read data into the processor, whether to be employed by software or stored in a cache.

Several approaches have been undertaken to address load address dependencies, and in particular load-hit-store conditions. In typical low frequency designs, one approach is to employ a handshake mechanism between a Load/Store Unit (LSU) and the issue logic that allowed the LSU to stall in response to a load-hit-store condition. However, the LSU handshake mechanism is not effective in higher frequency designs.

One approach to handle load-hit-store conditions in a high frequency design is to employ an issue queue in the issue logic to issued load/store instructions that have been sent to the LSU. When the LSU detects a load-hit-store condition, the offending instruction is rejected back to the issue logic, typically through a reject signal sent from the LSU to the issue queue. The issue queue then re-issues the offending instruction in a later load/store pipeline slot. However, this approach typically requires a complex issue queue mechanism, which incurs relatively high hardware size and power costs.

Therefore, there is a need for a system and/or method for a load address dependency mechanism in a high frequency, low power processor system that addresses at least some of the problems and disadvantages associated with conventional systems and methods.

SUMMARY OF THE INVENTION

The present invention provides for a method for a load address dependency mechanism in a high frequency, low power processor. A load instruction corresponding to a memory address is received. At least one unexecuted preceding instruction corresponding to the memory address is identified. The load instruction is stored in a miss queue. And the load instruction is tagged as a local miss.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, user interface or input/output techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or in some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
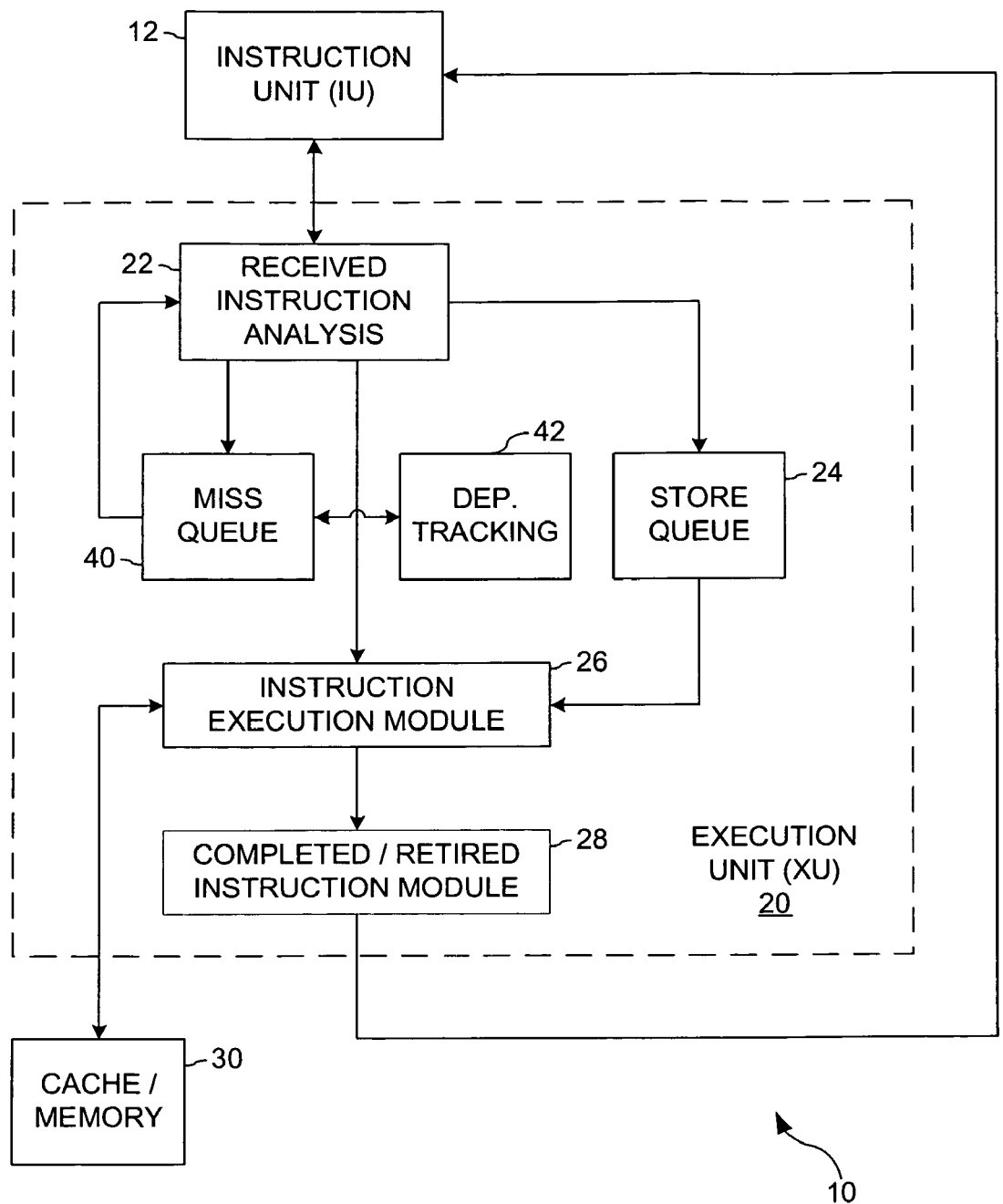
FIG. 1 is a block diagram depicting a load address dependency mechanism in a high frequency, low power processor system.

Referring to FIG. 1 of the drawings, the reference numeral 10 generally designates a group of components of a high frequency, low power microprocessor core. Core 10 includes instruction unit (IU) 12. IU 12 is a circuit or circuits or other suitable logic and is configured to receive load and store instructions. In particular, IU 12 receives load and store instructions from an executing program, identifies an appropriate execution unit (XU) to execute the instruction, receives notification from the XU when the instruction has been executed, and notifies or otherwise interfaces with the executing program based on the completed execution of the instruction, as will be understood to one skilled in the art. It will be understood to one skilled in the art that load instructions can include software and/or hardware prefetch requests.

In the illustrated embodiment, IU 12 is coupled to execution unit (XU) 20. XU 20 is a circuit or circuits or other suitable logic and, generally, is configured to receive, process, and execute load and store instructions, as described in more detail below. Generally, as used herein, an execution unit is a generic functional unit. It will be understood to one skilled in the art that an execution unit can include a Load/Store Unit (LSU), a Fixed Point Unit (FXU), a Floating Point Unit (FPU) and/or other suitable sub-units. In particular, XU 20 includes received instruction analysis module 22. Received instruction analysis module 22 is a circuit or circuits or other suitable logic and is configured to receive store instructions from IU 12, decode received load and store instructions to identify associated memory addresses, and to pass received instructions for processing and execution, as described in more detail below.

In particular, in the illustrated embodiment, received instruction analysis module 22 is configured to determine whether a received instruction is a load or store instruction. If the received instruction is a store instruction, received instruction analysis module 22 is configured to pass the received store instruction to store queue 24. Store queue 24 is a circuit or circuits or other suitable logic and is configured to receive store instructions from received instruction analysis module 22, and to pass received store instructions to instruction execution module 26 generally in the order they are received from received instruction analysis module 22. Accordingly, store queue 24 is also configured to hold or otherwise store received store instructions for subsequent transmission to instruction execution module 26, as will be understood to one skilled in the art.

If the received instruction is a load instruction, received instruction analysis module 22 is configured to determine whether there is an uncleared dependency for the load instruction, that is, whether the load instruction is subject to a load address dependency. Generally, received instruction analysis module 22 determines the memory address associated with the load instruction, and searches store queue 24 for unexecuted or otherwise uncleared store instructions with the same associated memory address. In an alternate embodiment, received instruction analysis module 22 is also configured to identify whether the load instruction conflicts with a previously issued load instruction, that is, whether a load-hit-reload condition exists. It will be understood to one skilled in the art that other configurations can also be employed. If the load instruction is not subject to an uncleared dependency, received instruction analysis module 22 is configured to pass the load instruction to instruction execution module 26.

Instruction execution module 26 is a circuit or circuits or other suitable logic and is configured to receive load and store instructions for execution, to execute received load and store instructions through access to or otherwise interaction with cache/memory module 30, and to pass completed or otherwise retired instructions to completed/retired instruction module 28, as will be understood to one skilled in the art. Cache/memory module 30 is a circuit or circuits or other suitable logic and is configured to store and retrieve data in response to instructions from instruction execution module 26, as will be understood to one skilled in the art. Completed/retired instruction module 28 is coupled to IU 12 and is configured to receive completed or otherwise retired instructions from instruction execution module 26, and to generate an instruction completion signal based on received completed/retired instructions, or otherwise to notify IU 12 that the received instruction has been executed, as will be understood to one skilled in the art.

If the load instruction under inspection by received instruction analysis module 22 is subject to an uncleared load address dependency, received instruction analysis module 22 is configured to pass the load instruction to miss queue 40 and to generate a miss signal or otherwise notify IU 12 that the load instruction has resulted in a "local miss." Generally, as will be understood to one skilled in the art, from the perspective of IU 12, a local miss appears as a level one (L1) cache lookup miss. Thus, XU 20 is configured to handle a load-hit-store condition without rejecting the offending instruction back to the IU or requiring a handshake mechanism with IU 12.

In one embodiment, when a load address dependency is detected, received instruction analysis module 22 is configured to tag or otherwise mark the load instruction as a local miss and to pass the tagged load instruction to miss queue 40. In a particular embodiment, received instruction analysis module 22 is configured to set one or more "wait" or "dependency" bits of the load instruction to embed the dependency information within the load instruction. In an alternate embodiment, received instruction analysis module 22 passes the load instruction to miss queue 40 without modification. In an alternate embodiment, received instruction analysis module 22 passes dependency information for the load instruction to dependency tracking module 42. It will be understood to one skilled in the art that other configurations can also be employed.

Miss queue 40 is a circuit or circuit or other suitable logic and is configured to receive dependent load instructions from received instruction analysis module 22, to store received load instructions, and to receive associated dependency information from dependency tracking module 42. Generally, dependency information is information identifying one or more previously issued uncleared store/reload commands with the same associated memory address as the subject load instruction. It will be understood to one skilled in the art that dependency information can also include information identifying one or more previously issued uncleared load commands with the same associated memory address as the subject load instruction.

Dependency tracking module 42 is a circuit or circuits or other suitable logic and is configured to receive dependency information associated with load instructions in miss queue 40, and to track received dependency information. In one embodiment, dependency tracking module 42 is configured to track or otherwise monitor store instructions in store queue 24 on which load instructions in miss queue 40 are dependent. In an alternate embodiment, dependency tracking module 42 is also configured to track or otherwise monitor load instructions in miss queue 40 and/or instruction execution module 26 on which load instructions in miss queue 40 are dependent. In a particular embodiment, dependency tracking module 42 is configured to reset a tag or other mark of the load instructions in miss queue 40. In an alternate embodiment, dependency tracking module 42 is configured to reset one or more "wait" or "dependency" bits of the load instruction, when the dependency is cleared, to embed the cleared dependency information within the load instruction.

Thus, dependency tracking module 42 can be configured to monitor load address dependencies for instructions stored in miss queue 40. In one embodiment, dependency tracking module 42 is configured to determine whether a load instruction stored in miss queue 40 is the oldest, or otherwise earliest-issued instruction, of the instructions remaining in store queue 24 and miss queue 40. If the load instruction is the oldest instruction, dependency tracking module 42 is configured to clear the associated dependencies and miss queue 40 passes the load instruction to received instruction analysis module 22 for pre-execution processing.

In an alternate embodiment, dependency tracking module 42 is configured to identify each dependency for a load instruction stored in miss queue 40, and to determine whether each and every identified dependency is cleared. If each and every identified dependency is cleared, dependency tracking module 42 is configured to clear the associated dependencies and miss queue 40 passes the load instruction to received instruction analysis module 22 for pre-execution processing.

In an alternate embodiment, dependency tracking module 42 is configured to identify at least one dependency for a load instruction stored in miss queue 40, and to determine whether the identified dependency is cleared. If the identified dependency is cleared, dependency tracking module 42 is configured to determine whether any additional dependencies for the load instruction exist. If no additional dependencies for the load instruction exist, or all additional dependencies are also cleared, dependency tracking module 42 is configured to clear the associated dependencies and miss queue 40 passes the load instruction to received instruction analysis module 22 for pre-execution processing. It will be understood to one skilled in the art that other configurations can also be employed.

In the illustrated embodiment, miss queue 40 is configured to return a cleared load instruction to received instruction analysis module 22 for subsequent return to the ordinary instruction pipeline. In an alternative embodiment, miss queue 40 can be configured to pass a cleared load instruction to instruction execution module 26 for execution. It will be understood to one skilled in the art that other configurations can also be employed.

It will be understood to one skilled in the art that many microprocessor core systems include a local load miss queue. Thus, core 10 can be configured to provide a cost effective and high frequency mechanism in a load-store unit (LSU) that employs an existing load miss queue to handle load address dependencies. As described in more detail above, a load instruction is issued to the LSU and an address compare is performed against outstanding stores/reloads. If a hit occurs, the load is places in the LSU miss queue and treated as a "local miss." Thus, core 10 avoids a handshake with IU 12, other than to indicate a "miss" signal. Moreover, the present invention does not require any form of an issue queue. Thus core 10 can be configured to reduce processing speed degradation caused by returning load address dependent instructions to IU 12, which can increase overall processor performance.

Figure 2:
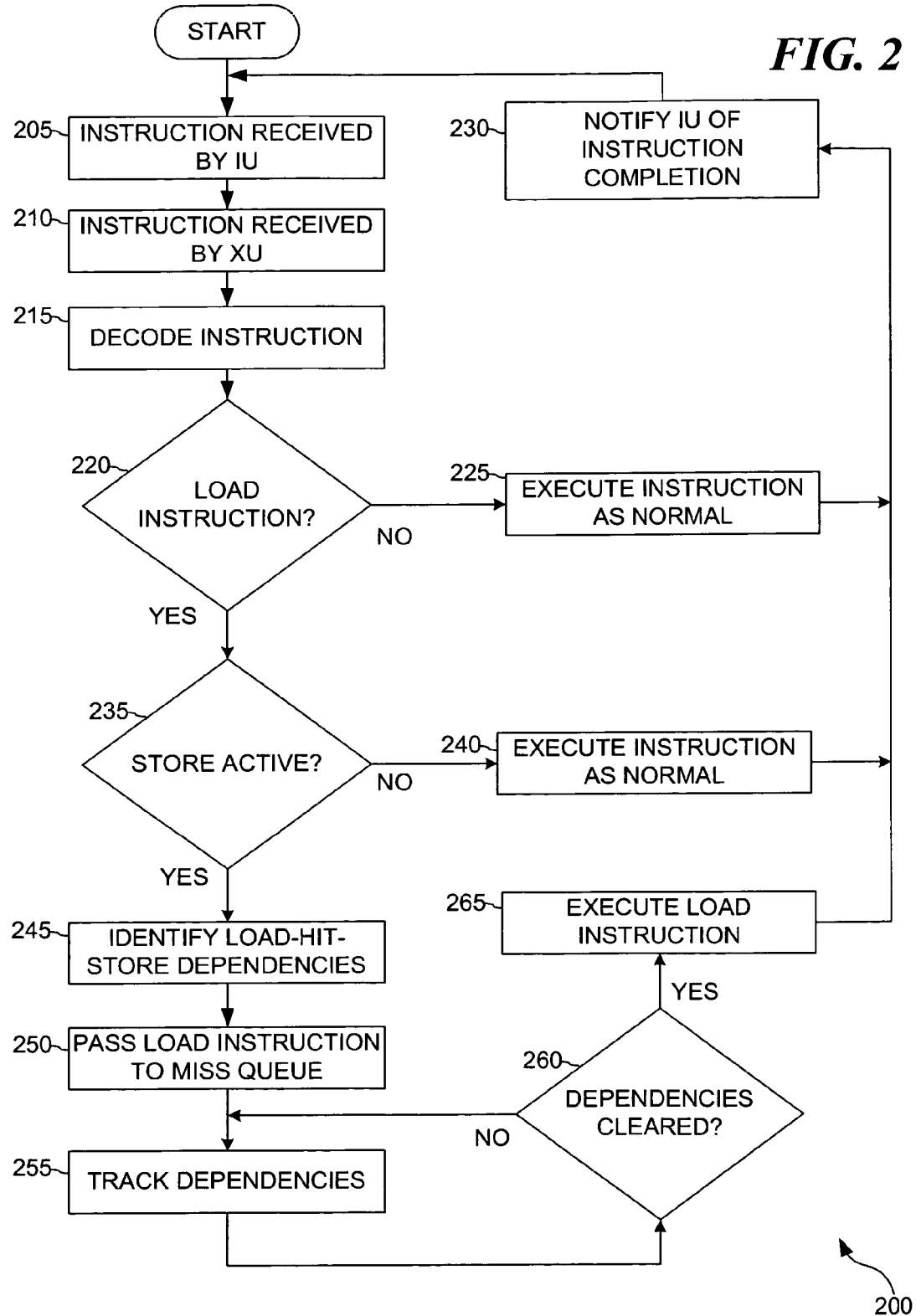
FIG. 2 is a flow diagram depicting a load address dependency mechanism method in a high frequency, low power processor system.

Referring to FIG. 2 of the drawings, the reference numeral 200 generally designates a flow diagram depicting the operation of a load address dependency mechanism in a high frequency, low power processor system. The process begins at step 205, wherein an instruction is received. This step can be performed by, for example, IU 12 of FIG. 1. This step can also include decoding the received instruction, identifying the appropriate execution unit (XU) to execute the instruction, and passing the received instruction to the identified XU. At next step 210, the instruction is received by the XU. This step can be performed by, for example, XU 20 of FIG. 1.

At next step 215, the received instruction is decoded. This step can be performed by, for example, XU 20, and in particular, received instruction analysis module 22 of FIG. 1. At next decisional step 220, a determination is made whether the decoded instruction is a load instruction. This step can be performed by, for example, received instruction analysis module 22 of FIG. 1. If at decisional step 220 the decoded instruction is not a load instruction, the process continues along the NO branch to step 225. At step 225, the decoded instruction is executed as normal, as will be understood to one skilled in the art. This step can be performed by, for example, instruction execution module 26 of FIG. 1. At next step 230, the IU is notified that the instruction has been executed or otherwise completed, as will be understood to one skilled in the art. This step can be performed by, for example, completed/retired instruction module 28 of FIG. 1. The process returns to step 205.

If at decisional step 220 the decoded instruction is a load instruction, the process continues along the YES branch to decisional step 235. At decisional step 235, a determination is made whether there are active store instructions with the same associated memory address as the decoded load instruction. This step can be performed by, for example, received instruction analysis module 22 of FIG. 1. It will be understood to one skilled in the art that this step can also include identifying whether there are active reload instructions with the same associated memory address as the decoded load instruction. For ease of illustration, the remainder of the process will be described with respect to load-hit-store load address dependencies. If at decisional step 235 there are no active store instructions with the same associated memory address as the decoded load instruction, the process continues along the NO branch to step 240. At step 240, the decoded instruction is executed as normal, as will be understood to one skilled in the art. This step can be performed by, for example, instruction execution module 26 of FIG. 1. At next step 230, the IU is notified that the instruction has been executed or otherwise completed, as described above. The process returns to step 205.

If at decisional step 235 there are active store instructions with the same associated memory address as the decoded load instruction, the process continues along the YES branch to step 245. At step 245, load-hit-store dependencies, the active instructions with the same associated memory address as the decoded load instruction, are identified. This step can be performed by, for example, dependency tracking module 42 of FIG. 1. At next step 250, the decoded load instruction is passed to a miss queue. This step can be performed by, for example, received instruction analysis module 22 of FIG. 1. This step can also include modifying or tagging the decoded load instruction to reflect the identified dependencies.

At next step 255, the identified dependencies are tracked. This step can be performed by, for example, dependency tracking module 42 of FIG. 1. As described above, this step can include determining whether the decoded load instruction is the oldest unexecuted instruction in the XU. This step can also include modifying or tagging the decoded load instruction to reflect any identified dependencies that have cleared. At next decisional step 260, a determination is made whether the identified dependencies have been cleared. This step can be performed by, for example, dependency tracking module 42 of FIG. 1. It will be understood to one skilled in the art that this step can include determining whether each and every identified dependency is cleared. If at decisional step 260 the identified dependencies have not been cleared, the process continues along the NO branch, returning to step 255. If at decisional step 260 the identified dependencies have been cleared, the process continues along the YES branch to step 265.

At next step 265, the decoded load instruction is executed. This step can be performed by, for example, instruction execution module 26 of FIG. 1. The process continues to step 230, wherein the IU is notified that the instruction has been executed, and the process returns to step 205. Thus, the illustrated process can be employed to handle load-hit-store and load-hit-reload conditions without requiring an issue queue in the IU, thereby reducing processing speed degradation caused by returning load-hit-store/reload condition instructions to the IU, which can increase overall processor performance.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for a load address dependency mechanism in a high frequency, low power processor comprising an instruction unit and an execution unit, the method comprising:

receiving, by the execution unit from the instruction unit, a load instruction corresponding to a memory address;

wherein the execution unit comprises a miss queue and an instruction execution module (IEM);

determining, by the execution unit, whether there is at least one unexecuted preceding instruction corresponding to the memory address in the IEM;

in the event there is at least one unexecuted preceding instruction corresponding to the memory address in the IEM, indicating, by the execution unit to the instruction unit, a local cache miss corresponding to the load instruction;

storing the load instruction in the miss queue;

tagging the load instruction as a local miss;

determining whether every one of the at least one unexecuted preceding instructions have been executed; and in the event every one of the at least one unexecuted preceding instructions have been executed, storing the load instruction in the IEM for execution.

2. The method as recited in claim 1, wherein the at least one unexecuted preceding instruction corresponding to the memory address is a store instruction.

3. The method as recited in claim 1, wherein the at least one unexecuted preceding instruction corresponding to the memory address is also a load instruction.

4. The method as recited in claim 1, wherein determining whether the at least one unexecuted preceding instruction has been executed comprises determining whether there are any unexecuted instructions older than the load instruction pending in the execution unit.

5. The method as recited in claim 1, further comprising determining whether there are additional unexecuted preceding instructions corresponding to the memory address.

* * * * *